United States Patent [19]

Kacer, Sr.

[11] Patent Number: 4,735,244
[45] Date of Patent: Apr. 5, 1988

[54] PALM TREE SKINNING AND TRIMMING APPARATUS

[76] Inventor: William J. Kacer, Sr., 2925 E. Grovers Ave., Phoenix, Ariz. 85032

[21] Appl. No.: 940,914

[22] Filed: Dec. 12, 1986

[51] Int. Cl.$^4$ .............................................. B27L 1/00
[52] U.S. Cl. .................................. 144/208 K; 144/2 Z
[58] Field of Search ............. 47/1 R; 144/2 Z, 208 R, 144/208 K, 340

[56] References Cited

U.S. PATENT DOCUMENTS

| | | | |
|---|---|---|---|
| 2,612,724 | 10/1952 | Llewellyn | 144/2 Z |
| 3,315,714 | 4/1967 | Meier | 143/32 |
| 3,364,961 | 1/1968 | Otterbach et al. | 144/2 |
| 3,364,962 | 1/1968 | Otterbach et al. | 144/2 |
| 3,385,332 | 5/1968 | Otterbach et al. | 144/2 |
| 3,454,058 | 7/1969 | Fend | 144/2 |
| 3,457,973 | 7/1969 | Meier | 144/2 |
| 3,461,925 | 8/1969 | Fend | 144/2 |
| 4,279,281 | 7/1981 | Nakamura | 144/2 |

Primary Examiner—W. Donald Bray
Attorney, Agent, or Firm—Charles E. Cates

[57] ABSTRACT

A self-propelled palm tree trimming and trunk skinning apparatus is disclosed which includes first and second curved arms pivotally affixed, at their respective first ends, to a coupling member. At the opposite ends of the curved arms, a tension spring is provided to pull the two arms toward one another. A cutting blade is carried by one of the curved arms, and the blade edge is oriented at an angle from the horizontal when the apparatus is operatively engaged with a palm tree trunk. A d-c motor/speed reduction unit/cog wheel system is provided for circumferentially driving the apparatus such that the cutting blade, as a result of its skewed orientation, causes the apparatus to follow a spiral path upwardly, the cutting edge of the blade skinning and trimming the trunk of the tree as it ascends. Upon completion of the operation, the direction of the motor is reversed permitting the apparatus to spiral downwardly. The reversible motor is preferably energized from an integral rechargeable power pack and is manipulated from a control box connected by a cable to the apparatus and suspended for access by an operator standing at ground level.

8 Claims, 1 Drawing Sheet

U.S. Patent    Apr. 5, 1988    4,735,244
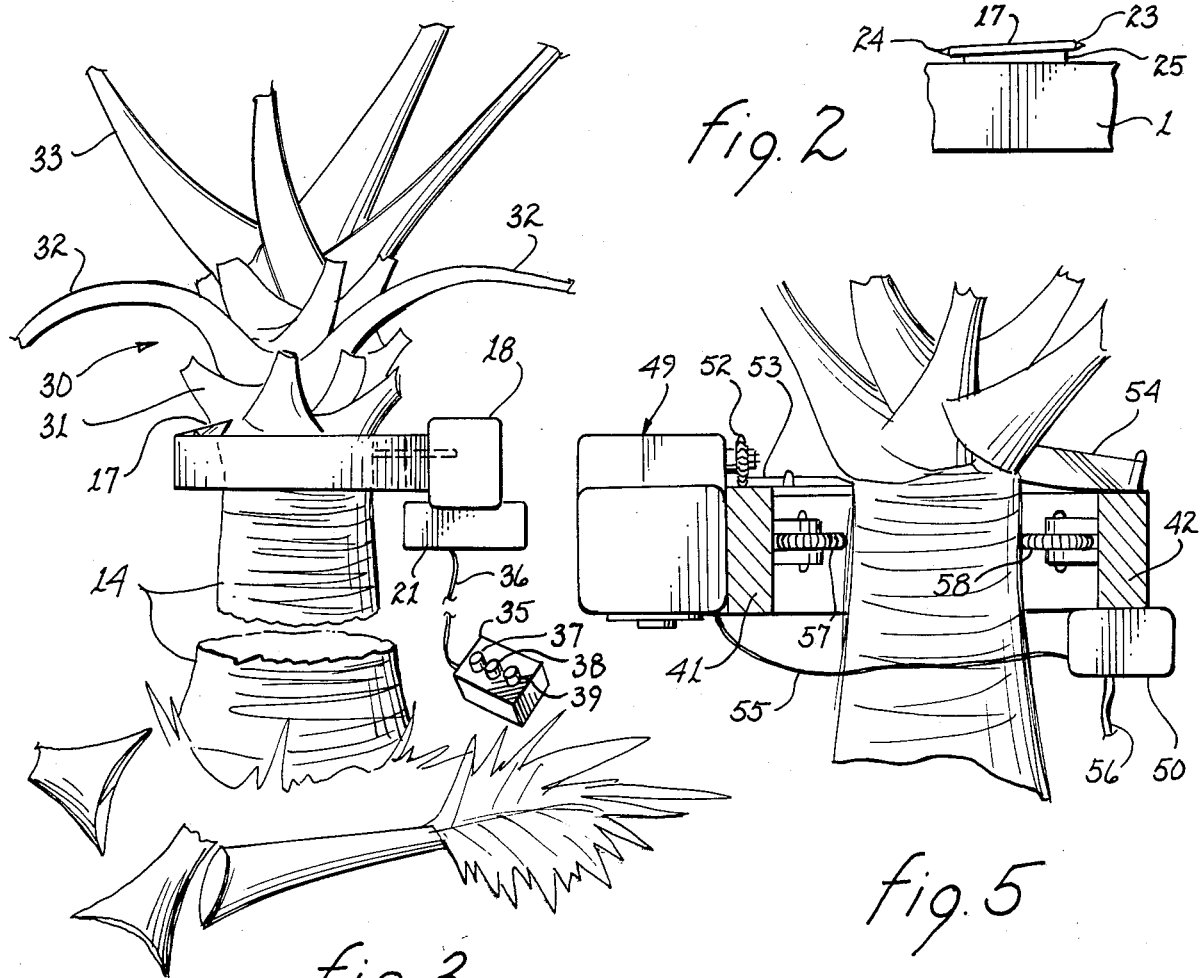
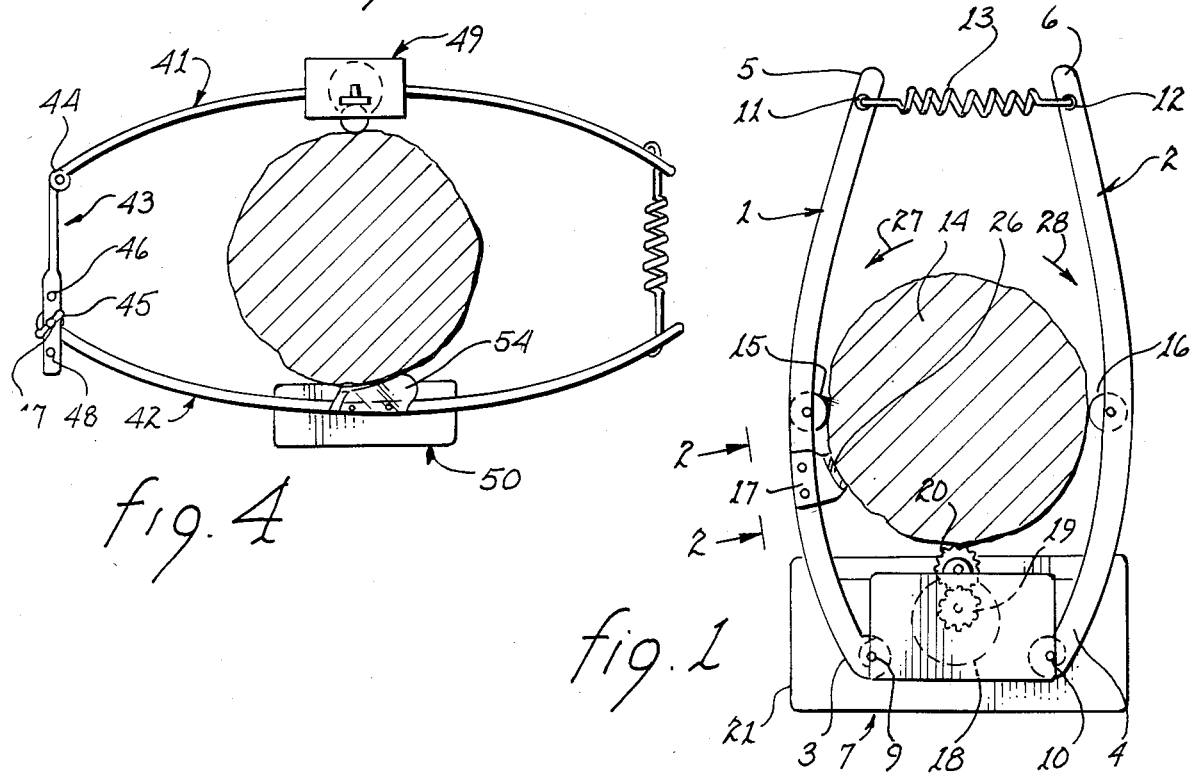

PALM TREE SKINNING AND TRIMMING APPARATUS

FIELD OF THE INVENTION

This invention relates to the art of palm tree maintenance and, more particularly, to apparatus for automatically skinning the trunks of the trimming the dead fronds from certain types of palm trees without the necessity for climbing the tree.

BACKGROUND OF THE INVENTION

Many varieties of palm trees (for example, washingtonia, filifera and robusta) have an appearance which is very much improved by periodic maintenance which includes skinning the trunk and peeling away the lowermost fronds. It is characteristic of the growth pattern of palm trees that the lower fronds tend to die and droop in a most unsightly manner as a tree extends its frond cluster upwardly with new growth. As a result, the typical maintenance of a palm tree involves climbing the tree and cutting the expired individual fronds near their points of attachment to the tree trunk. For some varieties, such "stubs" as may have been left by a prior trimming tend to become sufficiently weakend over a period of time (at least in some palm tree varieties) that they can be peeled away from the trunk to leave a very attractive "skinned" appearance, and a skinning operation is therefore often carried out at the same time as the trimming operation.

In order to maintain the desired appearance, palm trees have to be maintained in the manner noted above at least once a year and, for some varieties, more often than annually. The procedure involves either the use of long ladders or climbing the tree using traditional poleman's climbing spikes to reach a position at which the trimming (and/or skinning) operations are to take place. At that position, the workman passes a safety belt around the trunk of the tree and undertakes the trimming operation typically using a chain saw. The skinning is done by hand, sometimes following a supplementary cutting operation if a given stub is not quite peelable.

The time consuming, expensive and sometimes dangerous aspects of this traditional procedure are notoriously well-known to those skilled in the art. Not only are the ascent and descent steps potentially dangerous, but the use of a chain saw under the necessarily restricted conditions is manifestly an area for caution and concern. A still further potential source of danger is found in an occasional encounter with poisonous insects, such as scorpions and black widow spiders, which are native to many areas in which palm trees flourish.

It is toward eliminating these dangers associated with maintaining palm trees, as well as performing such operations in a simpler and less time consuming manner, that my invention is directed. Briefly, my invention contemplates apparatus which may be engaged with the trunk of a palm tree near ground level and which will thereafter ascend, on its own motion, skinning and trimming the tree as it progresses. Once the skinning and trimming operations have been carried out, the apparatus descends the trunk for ready removal and transfer to another tree.

Apparatus adapted to "climb" the trunks of deciduous trees and clear branches therefrom as it ascends is contemplated in the prior art although it will be understood by those skilled in the art that this task is a substantially different problem from that addressed by the present invention. Representative of such apparatus are implements disclosed in U.S. Pat. Nos. 4,279,281 to Nakamura; 3,461,925 to Fend; 3,457,973 to Meier; 3,454,058 to Fend; 3,385,332 to Otterbach et al; 3,364,962 to Otterbach et al; 3,364,961 to Otterbach et al; and 3,315,714 to Meier. These prior art references share common drawbacks. They are heavy, bulky and complex, with most of the devices disclosed literally carrying chain saws aloft to effect the debranching operation. Each is also characterized by the incorporation of driving means which must be skewed upwardly to force the apparatus to climb the trunk. My invention, which is specifically directed to the maintenance of palm trees, does not share these multiple drawbacks of complexity, weight, expense of construction, difficulty in use, etc. which are clearly present in these prior art devices for delimbing and trimming deciduous trees.

OBJECTS OF THE INVENTION

It is therefore a broad object of my invention to provide apparatus capable of maintaining a palm tree without the necessity for the operator's climbing the tree.

It is another object of my invention to provide such apparatus which is simple in structure and economical to fabricate.

It is still another object of my invention to provide such apparatus which is simple to operate and may readily be handled by a single person.

It is a yet further object of my invention to provide such apparatus which does not rely on deliberately skewed driving means to effect the ascent and descent of the palm tree trunk as the skinning and trimming operations are carried out.

In another aspect, it is an object of my invention to provide such an apparatus which does not require the incorporation of a chain saw or any other power driven cutting or sawing component.

SUMMARY OF THE INVENTION

These and other objects of my invention are achieved, according to a presently preferred embodiment, by the provision of a light framed structure including first and second curved arms pivotally affixed, at their respective first ends, to a coupling member. At the opposite ends of the curved arms, a tension spring is provided to pull the two arms toward one another. The curved arms are situated with their concave sides facing one another such that, when in operation, they encompass the trunk of a palm tree to be trimmed. A cutting blade is affixed to and carried by one of the curved arms, and the cutting edge of the blade is oriented at an angle from the plane containing the axes of the curved arms; i.e., from the horizontal when the apparatus is operatively engaged with a palm tree trunk. A system is provided for circumferentially driving the apparatus such that the cutting blade, as a result of its skewed orientation, causes the apparatus to follow a spiral path upwardly, the cutting edge of the blade skinning and trimming the trunk of the tree as it ascends. Upon completion of the operation, the direction of circumferential travel is reversed permitting the apparatus to spiral downwardly during its descent. Preferably, the motive power is obtained from a reversible d-c electric motor which drives, through a speed reduction unit, a horizontally disposed cog wheel which directly engages the trunk of the tree to provide the circumferential drive.

The reversible motor is preferably energized from an integral rechargeable power pack and is manipulated from a control box connected by a cable to the apparatus and suspended for access by an operator standing at ground level.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a top view of one embodiment of my invention illustrating it operatively engaged with the trunk of a palm tree to be processed;

FIG. 2 is a detail fragmentary view taken at the position indicated by the arrow F2 in FIG. 1 and particularly showing a key skewed blade component of my apparatus;

FIG. 3 illustrates my apparatus showing particularly the effect of its skinning and trimming operation during ascent;

FIG. 4 is a top view of another embodiment of my invention which is particularly adapted to adjustment to accommodate larger and diverse diameter palm tree trunks; and FIG. 5 illustrates the second embodiment of my invention situated at its upper most point during the tree servicing operation.

DETAILED DESCRIPTION OF THE INVENTION

Referring now to FIG. 1, there is shown a first embodiment of my invention which includes first and second curved arms 1, 2 respectively which are situated with their convex sides disposed in face to face relationship. The curved arms 1, 2 have first ends 3, 4 and second ends 5, 6, respectively. A coupling member generally indicated at 7 is situated intermediate the first ends 3, 4 of the curved arms 1, 2. The first ends 3 of the curved arm 1 is pivotally affixed to the coupling member 7 by a pivot 9; similarly, the first end 4 of the curved arm 2 is attached to the coupling member 7 at pivot 10.

Near the second ends 5, 6 of the curved arms 1, 2, apertures 11, 12 respectively extend through the curved arms. A tension spring 13 pulls the second ends 5, 6 of the curved arms 1, 2 toward one another when the apparatus is operably in position encompassing a palm tree trunk 14 by virtue of its ends being detachably connected between the apertures 11, 12.

Idlers 15, 16 are rotatably affixed to the respective curved arms 1, 2 intermediate the lengths thereof in order to establish a minimum clearance between the curved arms 1, 2 and the palm tree trunk 14. The cutting blade 17 is rigidly fixed to the curved arm 1 at a position proximate the position of the idler 15. As will be explained in further detail below, the cutting blade 17 is especially angularly positioned with respect to the curved arm 1.

The coupling member 7 includes, in this embodiment, an electric motor 18 and a conventional gear reduction unit (not shown in detail in FIG. 1) having an input driven by the electric motor 18 and an output represented by the gear 19. The gear reduction unit conventionally lowers the speed and increases the torque generated by the motor 18. Thus, the gear 19 rotates at a very much slower rate than the direct output of the motor 18. The gear 19 drives a cogged drive wheel 20 having teeth which directly engage the palm tree turnk 14. Therefore, it will be understood that when the motor 18 is energized, the entire apparatus moved circumferentially around the palm tree trunk 14 and, as will become more apparent below, also moves incrementally vertically.

While the motor 18 can be replaced with a small gasoline engine or an a-c motor energized by cable from a remote source, I prefer to use a d-c motor for the motor 18 which is selectively energized from an integral rechargeable power pack 21. The direction of rotation of such a d-c motor may be easily conventionally controlled (such as by simple reversing the polarity of energization to the armature in a shunt-wound motor), and the problems associated with accommodating a power cord to the circumferential movement of the apparatus are avoided.

Attention is now directed to FIG. 2, which is a view taken along the sight line indicated by the arrow F2 in FIG. 1. It will be observed that the cutting blade 17 has a leading edge 23 disposed forwardly of a trailing edge 24 and that the cutting blade is supported on the curved arm 1 by an angular block 25 in such a manner that the leading edge 23 is disposed higher than the trailing edge 24 with respect to the horizontal when the apparatus is operatively coupled to a palm tree trunk as illustrated in FIG. 1. Therefore, referring back to FIG. 1, it will be appreciated that the cutting edge 26 of the cutting blade 17 is skewed from the horizontal as it engages the palm tree trunk 14 to a depth governed by the size and position of the idler 15. As the apparatus rotates circumferentially around the palm tree trunk 14 upon energization of the d-c electric motor 18 in the direction indicated by the arrow 27, the cutting edge 26 biases the travel of the apparatus incrementally vertically upwardly. Similarly, when the direction of the electric motor 18 is reversed to redirect the rotation of the apparatus in the direction of the arrow 28, the apparatus will incrementally move downwardly vertically as it moves about the palm tree trunk 14.

The operation of the embodiment of the invention illustrated in detail in FIG. 1 may best be appreciated with reference to FIG. 3 in which the apparatus is shown operatively engaged with a palm tree 30 having a trunk 14, a region of frond stumps 31 which have been previously conventionally trimmed, a region of dead fronds 32 and a region of live fronds in a cluster 33. As those skilled in the art will appreciate, the dead fronds 32 appear in the lower region of the palm tree's frond cluster as the tree grows upwardly. Further, as those skilled in the art will also appreciate, any frond stumps 31 left from previous trimming operations become, over a period of time, relatively weakly attached to the surface of the palm tree trunk 14. Thus, as the apparatus ascends the trunk 14, the palm tree trunk is "skinned" of any remaining stumps 31 to obtain the sought-after bare appearance to the trunk by the action of the cutting blade 17, and the dead fronds 32 are likewise cut away by the cutting blade 17 to obtain this sought after appearance all the way to the base of the live frond cluster 33. Thereafter, the apparatus may be caused to descend by reversing the motor 18 as previously described.

It will be apparent that the energization and polarity of energization of the d-c motor 18 must be readily controllable from ground level. This control may be simply achieved by the provision of a control switch box 35 suspended from the rechargeable batter pack 21 (or any other convenient position on the apparatus) by an electrical cable 36. The control box 35 has three conventional latching switches 37, 38, 39. The switches 37, 38 and 39 are conventionally wired in circuit with the rechargeable battery pack 21 and the d-c electric motor 18 (FIG. 1) such that actuation of the switch 37 energizes the d-c motor to turn the apparatus in the direction in which the apparatus will ascend the tree trunk 14 in response to the bias supplied by the angular position of the cutting blade 17 with respect to the horizontal. Actuation of the switch 38 simply interrupts power to the motor 18 such that the apparatus stops its circumferential rotation. Actuation of the switch 39 reverses the polarity of the d-c energy supplied to the motor armature and hence the direction of the circumferential movement of the apparatus which therefor descends the palm tree trunk 14. When the apparatus is within reach, it may be removed from the palm tree 30 by again detaching one end of the tension spring 13 which permits the curved arms 1, 2 to be pivoted apart to facilitate the disengagement process.

FIGS. 4 and 5 illustrate a second embodiment of the present invention which is particularly suited for use with palm trees of widely varying diameter trunks and which also is particularly well balanced and easy to handle. More particularly, first and second curved arms, 41, 42 are pivotally affixed to a coupling member 43 by respective pivots 44, 45 situated intermediate first ends of the curved arms 41, 42. However, unlike the previously discussed embodiment of the invention, the pivot point 45 is movable between several positions obtained by the provision of apertures 46, 47, 48 to which the first end of the curved arm 42 may be selectively pinned as best shown in FIG. 4. The motive system is not carried in this region of the apparatus as in the earlier-described embodiment. Rather, the motor and gear reduction unit 49 is positioned centrally along the length of the curved arm 41, and the battery pack 50 is similarly situated centrally along the length of the curved arm 42. A tension spring 51 performs the same functions as the tension spring 13 illustrated in FIG. 1 with respect to the earlier described embodiment.

Merely to illustrate conventional variations in the manner in which the electric motor's torque may be communicated to the tree trunk it will be seen, as best illustrated in FIG. 5, that the output from the motor and gear reduction unit 49 is a vertically oriented bevel gear 52 which drives bevel gear/drive wheel 53 at right angles. Cutting blade 54 is conveniently situated atop the curved arm 42 generally above the battery pack 50 and is angularly skewed as previously discussed with respect to cutting blade 17 in the earlier described embodiment. Power from the rechargeable battery pack 50 is communicated to the motor/gear reduction unit 49 by conductor 55, and direction and energization control is obtained from a control unit (not shown in FIGS. 4, 5) connected to the apparatus through a cable 56. Idlers 57, 58 provide the requisite clearance as the apparatus moves about a tree trunk and also governs the degree of engagement with the tree trunk of the drive wheel 53 and cutting blade 54. The apparatus is shown in its uppermost position in FIG. 5 after it has totally skinned and trimmed a palm tree up to the live frond cluster. It is therefore in position to be reversed to descend the tree trunk.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. Apparatus for skinning the trunk of a palm tree and trimming spent fronds from the bottom region of the palm tree's frond cluster, said apparatus comprising:
   (A) first and second curved arms, each said curved arm having concave and convex sides and first and second ends;
   (B) coupling means situated intermediate said first ends of said first and second curved arms;
   (C) first and second pivot means respectively pivotally affixing said first ends of said first and second curved arms to said coupling means with said concave edges facing one another;
   (D) first and second apertures situated, respectively, proximate said second ends of said first and second curved arms;
   (E) a tension spring detachably connected between said first and second apertures;
   (F) a cutting blade affixed to and carried by one of said curved arms on the concave side thereof, said cutting blade having a cutting edge oriented inwardly into the area between said concave edges of said first and second curved arms;
   (G) motive means adapted to engage the trunk of a palm tree encompassed by said curved arms and adapted to drive said apparatus generally circumferentially around the trunk of the palm tree; and
   (H) bias means for urging said apparatus incrementally vertically as it is driven around the trunk of the palm tree;

whereby, a palm tree may be trimmed without the operator's climbing the trunk by detaching said tension spring from one of said apertures, encompassing the tree trunk with said curved arms near ground level with said apparatus oriented generally horizontally, reattaching said spring to said aperture such that said cutting edge of said blade engages the tree trunk and thereafter energizing said motive means whereupon, under the influence of said bias means, said apparatus travels circumferentially around the tree trunk and incrementally upwardly thereon to skin with said cutting edge any frond bases which may have previously been left on the tree trunk and to remove, by the action of said cutting edge, any previously untrimmed fronds situated in the lower region of the palm tree's frond cluster.

2. The palm tree skinning and trimming apparatus of claim 1 in which said bias means is effected by the engagement of said cutting blade with the tree trunk, said cutting blade:
   (A) including leading and trailing ends, said leading end being disposed forwardly of said trailing edge in the direction of circumferential travel when said apparatus is ascending a palm tree trunk; and
   (B) being supported by said one curved arm with said leading edge disposed higher than said trailing edge with respect to the horizontal when said apparatus is operatively coupled to a palm tree trunk;

whereby said cutting blade tends to guide said apparatus incrementally upwardly when said apparatus is moving circumferentially about a tree trunk in a first direction and tends to guide said apparatus incrementally downwardly when said apparatus is moving circumferentially about a tree trunk in the direction opposite the first direction.

3. The palm tree skinning and trimming apparatus of claim 2 in which said motive means includes:
   (A) an electric motor;
   (B) gear reduction means having an input connected to said electric motor and an output, said gear reduction means adapted to lower the speed and increase the torque generated by said motor;
   (C) a drive wheel connected to and driven by said output of said gear reduction means, said drive wheel:
      1. being generally horizontally oriented when said apparatus is operatively attached to a palm tree trunk; and
      2. carrying teeth about its periphery for engaging the tree trunk and thereby driving the apparatus generally circumferentially around the tree trunk when said electric motor is energized.

4. The palm tree skinning and trimming apparatus of claim 3 in which said electric motor comprises a d-c motor and in which said motive means further includes:
   (A) a rechargeable d-c battery pack; and
   (B) control means connected by a cable to said electric motor and to said d-c battery pack, said control means including switch means for selectively energizing said electric motor from ground level.

5. The palm tree skinning and trimming apparatus of claim 4 in which:
   (A) the direction of rotation of said d-c electric motor is electrically reversible; and
   (B) said control means includes reversing switch means for reversing the direction of rotation of said electric motor from ground level;
whereby said apparatus moved upwardly along the tree trunk when said electric motor is energized for rotation in a first direction and, conversely, said apparatus moves downwardly along the tree trunk when said electric motor is energized for rotation in the opposite direction.

6. The palm tree skinning and trimming apparatus of claim 5 in which said motive means is integral with said coupling means.

7. The palm tree skinning and trimming apparatus of claim 5 in which:
   (A) said motive means is carried intermediate the length of one of said curved arms; and
   (B) said coupling means further includes tree size adjusting means for adjusting the distance between said first and second pivot means.

8. The palm tree skinning and trimming apparatus of claim 7 in which said battery pack is carried intermediate the length of said curved arm opposite said curved arm which carries said d-c motor and said gear reduction means.

* * * * *